(12) United States Patent
Krass

(10) Patent No.: US 6,179,428 B1
(45) Date of Patent: Jan. 30, 2001

(54) ADJUSTABLE REARVIEW MIRROR

(75) Inventor: Craig R. Krass, Rockford, IL (US)

(73) Assignee: DaimlerChrysler Corporation, Auburn Hills, MI (US)

( * ) Notice: Under 35 U.S.C. 154(b), the term of this patent shall be extended for 0 days.

(21) Appl. No.: 09/574,614

(22) Filed: May 18, 2000

(51) Int. Cl.[7] .............................. G02B 7/182; B60R 1/06
(52) U.S. Cl. ......................... 359/841; 359/872; 359/881; 248/478; 248/480; 248/483
(58) Field of Search ..................................... 359/841, 871, 359/872, 881; 248/478, 480, 483

(56) References Cited

U.S. PATENT DOCUMENTS

| | | |
|---|---|---|
| 3,820,877 * | 6/1974 | Moyer . |
| 3,954,328 * | 5/1976 | Ames . |
| 4,558,930 * | 12/1985 | Deedreek . |
| 4,711,538 | 12/1987 | Ohs et al. . |
| 4,730,913 | 3/1988 | Boothe . |
| 4,907,871 * | 3/1990 | Hou . |
| 4,911,545 * | 3/1990 | Miller . |
| 4,998,812 * | 3/1991 | Hou . |
| 5,039,055 | 8/1991 | Lempelius . |
| 5,227,924 * | 7/1993 | Kerper . |
| 5,483,385 | 1/1996 | Boddy . |
| 5,513,048 | 4/1996 | Chen . |
| 5,546,239 | 8/1996 | Lewis . |
| 5,572,376 * | 11/1996 | Pace . |
| 5,903,402 | 5/1999 | Hock . |
| 5,969,890 | 10/1999 | Whitehead . |
| 6,024,459 | 2/2000 | Lewis . |

* cited by examiner

Primary Examiner—Ricky D. Shafer
(74) Attorney, Agent, or Firm—Lawrence J. Shurupoff

(57) ABSTRACT

An arrangement for a rearview mirror for an automotive vehicle utilized for towing a trailer is provided and includes a base support for connection to the vehicle; a single support arm having a first end connected with the base support, the support arm having a plurality of opposing indentions axially separated from one another on the support arm; a mirror housing, having a closed front end and an open rear end, and a side end adjacent the vehicle with an aperture to receive the support arm therethrough; upper and lower spring supports mounted within the mirror housing oriented towards an indention; a first and second springs mounted by the spring supports; a first detent ball biased towards the indentions in the support arm by the first spring to capture a position of the mirror housing upon the support arm; a second detent ball biased towards the indentions in the support arm by the second spring to capture the position of the mirror housing on the support arm; a stop mounted on the support arm to prevent the mirror housing from being removed from the support arm away from the vehicle; and a plate mirror closing the open rear end of the mirror housing.

12 Claims, 1 Drawing Sheet

ADJUSTABLE REARVIEW MIRROR

FIELD OF THE INVENTION

The present invention relates to an automotive vehicle exterior rearview mirror. More specifically, the present invention relates to an exterior rearview mirror which is particularly useful for a vehicle occasionally utilized for towing a trailer, camper, boat, storage container or the like, but which also has a substantial duration of operation with no vehicle being towed.

BACKGROUND OF THE INVENTION

Vehicles, such as sport utility vehicles and light trucks, are often purchased because of their ability for towing other vehicles such as campers, recreational vehicles, boats, storage containers and the like. During normal operation of the vehicle, a conventional side rearview mirror allows the vehicle operator to view traffic at the rear of the vehicle. However, when the vehicle is being used to tow another vehicle and the vehicle operator wants to view traffic at the rear of the towed vehicle, a conventional side rearview mirror usually does not offer such a view, particularly when the object being towed has a wide width such as a boat or trailer home. One solution to the rearview vision problem when towing a load has been to provide an extended mirror mounting frame which holds the mirror far away from the lateral side of the towing vehicle so that the operator can observe the rear of their tow. However, extra-wide mirror mounting frames usually have a three-part support frame that must be permanently affixed to the vehicle, which is aesthetically undesirable. Quite often the features affecting its appearance are a critical factor in the decision-making process when purchasing an automotive vehicle. It is therefore desirable to provide an extendable mirror that closely resembles the appearance of a non-extendable conventional rearview mirror when the vehicle is not being utilized to tow.

It is also desirable to provide an extendable rearview mirror which not only can be manually positioned, but which can be tilted or pivoted along a horizontal axis to allow for easier adjustment by grabbing the housing without having to touch the mirror glass. It is also desirable to provide an extendable rearview mirror that has a sturdy construction and is inexpensive to manufacture.

SUMMARY OF THE INVENTION

To make manifest the above delineated desires the revelation of the present invention is brought forth. The present invention provides a vehicle operator the freedom to manually extend the rearview mirror away from the vehicle when the vehicle is being utilized to tow another vehicle such as a trailer or boat. A preferred embodiment of the present invention also allows the vehicle operator to pivot the mirror for up and down adjustment by grabbing the housing of the mirror without contacting the plate glass mirror. Furthermore, the preferred embodiment of the present invention provides the freedom of providing an extendable mirror at a low manufacturing cost while at the same time providing an extendable mirror which is aesthetically appealing in its innermost position by having the appearance of a conventional rearview mirror. In the preferred embodiment, the present invention provides an arrangement for a rearview mirror for an automotive vehicle utilized for towing a trailer or like vehicle. The rearview mirror arrangement includes a base support for connection to an outer surface of the vehicle adjacent a window panel of the vehicle. A single support arm is fixably connected along its first end with the base support. The support arm has a plurality of annular circular cross-sectional grooves, which are axially separated from one another. A mirror housing is provided having a forward closed end and an open rear end. A side of the mirror housing adjacent the vehicle has an aperture to receive the support arm therethrough. Adjacent to the vehicle side of the mirror housing is an upper spring support providing a nest for an upper spring. One hundred eighty degrees from the upper spring support is a second spring support which provides a nest for an opposing lower spring. A first detent ball is biased towards the groove in the support arm by the first spring to capture a position of the mirror housing on the support arm. In like manner a second detent ball is biased towards the annular groove in the support arm by the second spring to capture the position of the mirror housing on the support arm. A stop is mounted on a second end of the support arm opposite the first end having a major dimension larger than the aperture in the mirror housing to prevent the mirror housing from being removed from the support arm. A mirror plate conceals the support arm spring housing's springs and detent balls from view and also closes the rear end of the support mirror housing. The position of the mirror housing upon the support arm can be adjusted in and out by simply axially translating the housing on the support arm. To adjust the mirror up and down, the vehicle operator simply grabs the housing and pivots it upon the support arm.

It is an object of the present invention to provide an extendable rearview mirror.

It is an object of the present invention to provide an extendable rearview mirror wherein the mirror housing can be pivoted.

The above noted objects and other features of the present inventive automotive vehicle exterior rearview mirror will become more apparent to those skilled in the art as the invention is further explained in the accompanying drawings and detailed description.

DETAILED DESCRIPTION OF THE INVENTION

Figure 1:
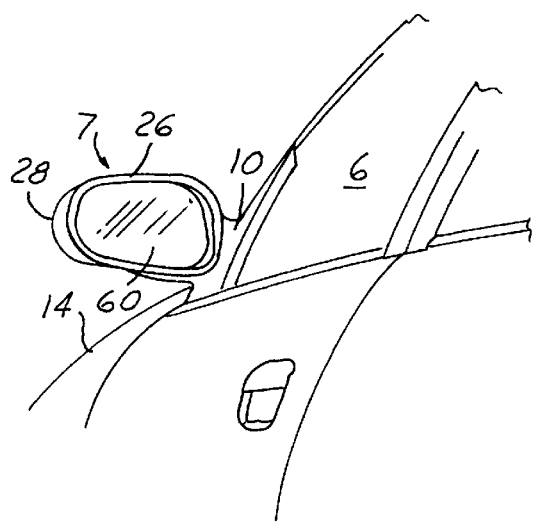
FIG. 1 is a rear perspective view of an arrangement of a rearview mirror for an automotive vehicle utilized for towing a trailer or like vehicle according to the present invention shown in its environment in connection to the side of an automotive vehicle.

FIG. 1 illustrates a preferred embodiment arrangement of an exterior rearview mirror 7 according to the present invention. The mirror 7 is utilized on an automotive vehicle 14 which tows a trailer or light vehicle. The rearview mirror 7 has a base support 10 which is connected to the outer surface of vehicle 14 adjacent the front window panel 6. Referring additionally to FIG. 3, a single support arm 16 is provided. The support arm 16 has a first end 18 fixably connected with the base support 10. The support arm 16 has a plurality of opposing indentions 22 which are axially separated from one another. In the embodiment of the invention shown in FIG. 2 the indentions are formed by annular grooves on the support arm 16. In an embodiment (not shown) the indentions 22 can be semi-hemispheric and geometrically separated from one another along an outer diameter of the support arm 16. The top of the groove provides indentions 22A. The bottom of the groove provides an opposing indention 22B.

The rearview mirror 7 has a mirror housing 26. The mirror housing 26 has a forward closed end 28 and a rearward open end 30. A side of the mirror housing adjacent the vehicle 14 has an aperture 32 to receive the support arm 16 which extends therethrough.

The mirror housing 26 also has a first or upper spring support 34. The upper spring support 34 is mounted within the mirror housing 26 adjacent the aperture 32. The upper spring support 34 has a nest 36 oriented towards the indentions 22A of the support arm 16. The mirror housing 26 also has a second or lower spring support 38. The lower spring support 38 is oriented 180 degrees from the upper spring support 34. The lower spring support 38 has a nest 40 for mounting a spring towards indentions 22B generally opposite the first nest 36. Mounted within the first nest 36 is a first coil spring 42. Mounted within the second nest 40 is a second coil spring 44 which typically will have a spring constant equal to the spring constant of the first spring 42. Spring biased towards indention 22A is a first detent ball 50. Spring biased towards the indention 22B is a second detent ball 52.

Generally opposite the first end 18 of the support arm 16 is a second end 19 of the support arm 16. The support arm second end 19 is enlarged to provide a stop 56. The stop 56 is greater in its major dimension than aperture 32 and prevents the mirror housing 26 from being removed from or pulled off support arm 16 away from the vehicle 14.

A plate 60 is provided for the mirrored surface. The plate 60 closes the rear end 30 of the mirror housing and conceals the support arm 16, the upper spring support 34 and the lower spring support 36 along with the detent balls 50 and 52 from view of the vehicle operator.

Figure 2:
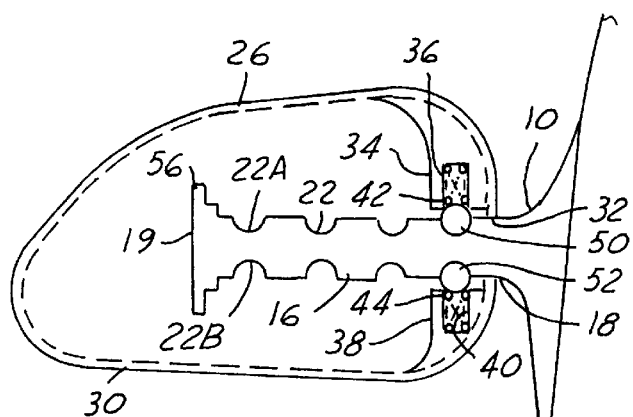
FIG. 2 is a front elevational view of the rearview mirror shown in FIG. 1 with the plate glass being removed to illustrate the various components of the present invention.
Figure 3:
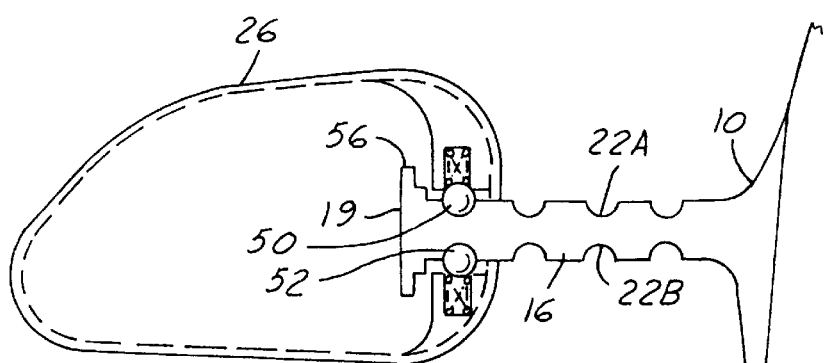
FIG. 3 is an operational view of the rearview mirror shown in FIGS. 1 and 2 illustrating extension of the mirror to its outward position when a trailer or light vehicle is being towed.

In normal operation the rearview mirror 7 is in the position shown in FIGS. 1 and 2. To most observers the rearview mirror 7 will look no different than a conventional rearview mirror typically provided in most vehicles. When the vehicle 14 is towing a trailer or light vehicle, the operator from either outside or inside the vehicle can take their hand and translate the mirror housing 26 outward. The translation of the mirror housing 26 outward will cause the detent balls 50 and 52 to be rolled out of their position within the indentions 22A and 22B and then will be repositioned in the adjoining indentions unless the vehicle operator continues to translate the mirror housing 26 further outward. In the last detent position as shown in FIG. 3, if the operator inadvertently attempts to translate the mirror housing 26 further outward, the stop 56 will prevent the mirror housing 26 from being pulled off of the support arm 16. To place the mirror housing 26 in its original position the operator will simply translate the mirror housing 26 in the opposite direction. Due to the annular groove configuration of the indentions 22, to adjust the rearview mirror up and down, the vehicle operator can simply grab the mirror housing 26 and pivot the mirror housing 26 about the support arm 16. This is very convenient and provides the advantage that the vehicle operator does not have to touch the mirror glass plate 60 to pivot it for up and down adjustment.

Figure 4:
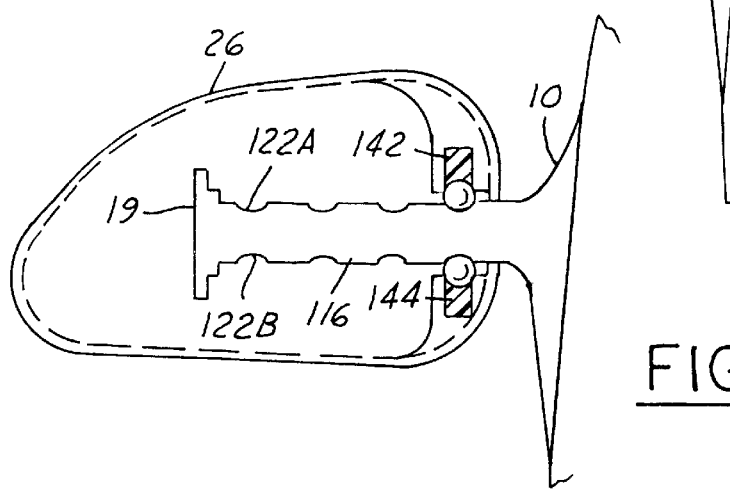
FIG. 4 is a view similar to that of the alternate preferred embodiment of the present invention as shown in FIG. 2.

Referring to FIG. 4, an alternate preferred embodiment of the present invention is shown with like items given identical reference numerals. The detent balls 50 and 52 are biased by elastomeric solid springs 142 and 144. The elastomeric springs provide certain advantages in that they seal themselves within their respective nests and thus prevent precipitation or other dirt or foreign matter from entering the spring nest and compromising their prolonged operation. Additionally, the indentions 122A and 122B of the support arm 116 are provided by a non-circular cross-sectional shaped annular groove. The non-circular shape of the groove allows a further refinement in the force displacement curve in the translational force required for axial adjustment of the mirror housing 26. The embodiment of FIG. 4 may be particularly helpful to a vehicle operator having a disability that requires a lower force for axial adjustment.

While preferred embodiments of the present invention have been disclosed, it is to be understood that they have been described by way of example only and that various modifications can be made without departing from the spirit and scope of this invention as it is encompassed and revealed in the following claims.

We claim:

1. An arrangement for a rearview mirror for an automotive vehicle utilized for towing a trailer, said mirror arrangement in combination comprising:

a base support for connection to an outer surface of said vehicle adjacent a window panel of said vehicle;

a single support arm having a first end fixably connected with said base support, said support arm having a plurality of opposing indentions axially separated from one another on said support arm;

a mirror housing, said mirror housing having a closed front end and an open rear end, said mirror housing having a side end adjacent said vehicle with an aperture to receive said support arm therethrough;

a first spring support mounted within said mirror housing oriented towards one of said indentions on said support arm;

a second spring support mounted within said housing oriented towards another one of said indentions on said support arm 180 degrees from said first spring support;

a first spring mounted by said first spring support;

a second spring mounted by said second spring support;

a first detent ball biased towards said one of said indentions in said support arm by said first spring to capture a position of said mirror housing upon said support arm;

a second detent ball biased towards said another one of said indentions in said support arm by said second spring to capture said position of said mirror housing on said support arm;

a stop mounted on said support arm having a major dimension larger than said aperture in said mirror housing to prevent said mirror housing from being removed from said support arm away from said vehicle;

a plate mirror closing said open rear end of said mirror housing; and wherein said mirror housing can be positionally adjusted about said indentions on said support arm by axially translating said mirror housing on said support arm.

2. An arrangement for a rearview mirror for an automotive vehicle utilized for towing a trailer as described in claim 1, wherein said first spring support is a nest which allows for insertion of said first spring.

3. An arrangement for a rearview mirror for an automotive vehicle utilized for towing a trailer as described in claim 1, wherein said second spring support is a nest for insertion of said second spring.

4. An arrangement for a rearview mirror for an automotive vehicle utilized for towing a trailer as described in claim 1, wherein said first and second spring supports are adjacent a side of said mirror housing adjacent to said aperture.

5. An arrangement for a rearview mirror for an automotive vehicle utilized for towing a trailer as described in claim 1, wherein said first spring is a coil spring.

6. An arrangement for a rearview mirror for an automotive vehicle utilized for towing a trailer as described in claim 1, wherein said second spring is a coil spring.

7. An arrangement for a rearview mirror for an automotive vehicle utilized for towing a trailer as described in claim 1, wherein one of said springs is an elastomeric spring.

8. An arrangement for a rearview mirror for an automotive vehicle utilized for towing a trailer as described in claim 1, wherein said first spring support is a nest.

9. An arrangement for a rearview mirror for an automotive vehicle utilized for towing a trailer as described in claim 1, wherein at least one of said indentions has a circular cross-sectional shape.

10. An arrangement for a rearview mirror for an automotive vehicle utilized for towing a trailer as described in claim 1, wherein at least one of said indentions has a non-circular cross-sectional shape.

11. An arrangement for a rearview mirror for an automotive vehicle utilized for towing a trailer as described in claim 1, wherein at least one of said indentions is an annular groove formed on said support arm.

12. An arrangement for a rearview mirror for an automotive vehicle utilized for towing a trailer, said mirror arrangement in combination comprising:

a base support for connection to an outer surface of said vehicle adjacent a window panel of said vehicle;

a single support arm having a first end fixably connected with said base support, said support arm having a plurality of annular groove indentions axially separated from one another;

a mirror housing, said mirror housing having a closed front end and an open rear end, said mirror housing having a side end adjacent said vehicle with an aperture to receive said support arm therethrough;

a first spring support mounted within said mirror housing adjacent said aperture in said side end;

a second spring support mounted within said mirror housing oriented towards one of said indentions 180 degrees from said first spring support;

a first coil spring mounted by said first spring support;

a second coil spring mounted by said second spring support;

a first detent ball biased towards said one of said indentions in said support arm by said first coil spring to capture a position of said mirror housing upon said support arm;

a second detent ball biased towards another one of said indentions in said support arm by said second coil spring to capture said position of said housing on said support arm;

a stop mounted on said support arm having a major dimension larger than said aperture in said mirror housing to prevent said mirror housing from being removed from said support arm away from said vehicle;

a plate mirror closing said open rear end of said mirror housing; and wherein said mirror housing can be positionally adjusted about said indentions on said support arm by axially translating said mirror housing on said support arm and wherein said mirror housing can be vertically adjusted by pivotally moving said housing on said support arms.

* * * * *